March 29, 1955     T. A. OLSON     2,704,900

TOGGLE TYPE FLEXIBLE GATE FASTENER

Filed Aug. 3, 1953

Thomas A. Olson
INVENTOR.

BY

ATTORNEY

United States Patent Office 2,704,900
Patented Mar. 29, 1955

2,704,900
TOGGLE TYPE FLEXIBLE GATE FASTENER

Thomas A. Olson, Houston, Tex.

Application August 3, 1953, Serial No. 371,769

4 Claims. (Cl. 39—74)

This invention relates to improvements in gate fasteners.

The primary object of the invention is to provide a gate fastener designed to effectively hold a wire gate in closed position and which can readily be released when desired.

Another object is to provide a fastener for wire gates which will act to tightly stretch the wire strands forming the gate when the latch is applied to hold the gate.

A further object is to provide a gate fastener which can be quickly and easily manipulated to open or close the gate, which is of simple, durable, and low-cost construction.

These and other objects and advantages of the present invention will become more readily apparent from the following detailed description and from the accompanying drawing which illustrates a useful embodiment in accordance with this invention.

Figure 1:
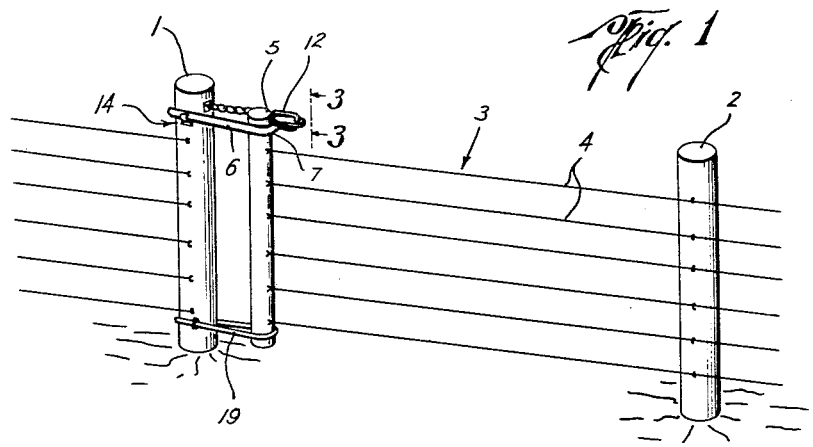
Fig. 1 is a perspective view of the fastener showing the same in position when the gate is closed.

Referring to the drawing, the numerals 1 and 2 designate a pair of spaced apart fence posts which define a gateway between them. Posts 1 and 2 may be formed from tubular metal or from wood, as may be desired. A gate, designated generally by the numeral 3, is positioned between posts 1 and 2 and is constructed of a plurality of parallel wire strands 4, the wire strands each having one end secured to a tubular gate bar 5 and the other end to the post 2. The wire strands, as illustrated, may be continuations of the fence wires.

The fastener comprises an elongated operating handle 6 which may be of tubular form, which is provided at one end with a curved keeper 7 defining on its inner surface a concave arcuate seat 8 adapted to receive gate bar 5. The outer end of keeper 7 has a short lever arm 9 rigidly secured thereto to extend substantially parallel to handle 6 and to project from keeper 7 oppositely to handle 6. A flexible link 10, which may be a short length of metal chain, as shown, or steel cable, has one end suitably secured to post 1 adjacent its upper end, as by means of a screw eye 11, and the other end connected to an elongated link or clevis 12 which is journalled at 13 in the end of lever arm 9 which is remote from keeper 7. Lever arm 9 is preferably constructed from a short length of flat metal, whereby it may swing transversely through clevis 12. A latch member, designated generally by the numeral 14, is secured to post 1 at a point angularly spaced, preferably 90°, from screw eye 11. Latch member 14 is composed of a laterally projecting shank portion 15 having its outer end formed to provide an upwardly and inwardly turned portion 16 adapted to receive handle 6. A hole or opening 17 is provided in shank portion 15 inwardly of the inner end of hook portion 16 for the reception of a locking pin 18, or other suitable locking device, which will serve to retain handle 6 in hook portion 16.

Post 1 has secured near its lower end a loop 19 in which the lower end of gate bar 5 is engaged when the gate is being fastened and holds the lower end of said bar properly after the gate is fastened.

Figure 2:
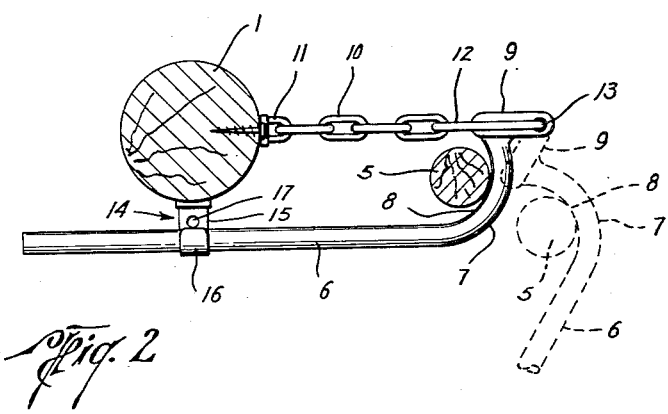
Fig. 2 is an enlarged plan view of the device, the closed position being shown in full lines and a position assumed by the device during opening or closing of the gate being shown in broken lines.
Figure 3:
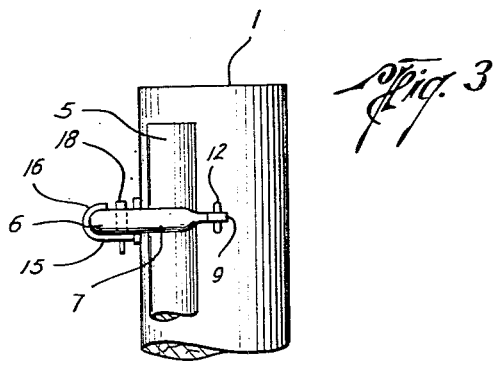
Fig. 3 is an enlarged elevational view as seen from line 3—3 of Fig. 1.

The operation of the device is as follows: The lower end of gate bar 5 will be inserted in loop 19. Handle 6 will be swung forwardly to the position indicated by broken lines in Fig. 2 and keeper 7 placed about the upper end of bar 5 so that the bar will be received in seat 8. It will be noted that lever arm 9 will swing outwardly from clevis 8. Handle 6 will then be swung rearwardly and inwardly toward post 1, drawing bar 5 toward the post. This movement will swing lever arm 9 inwardly, thereby applying leverage to link 10 to urge it outwardly along its longitudinal axis. The additional leverage thus supplied by arm 9 will apply increasing tension to strands 4 as handle 6 moves toward post 1, and will thereby effectively stretch wire strands 4. The end of handle 6 is pushed over and past hook portion 16 of the latch, whereupon the force on handle 6 will be relaxed sufficiently to allow the handle to be retracted by the tension in the wire strands into hook portion 16 of the latch which will thereby retain the arm in the gate closing position. Locking pin 18 may then be inserted in hole 17 to prevent accidental release of handle 6 from latch 14. It will be understood that latch pin 18 may be replaced by any other suitable locking arrangement including a pad-lock by which the handle can be held in closed position until the pad-lock is unlocked and removed.

To open the fastener, lock pin 18, or other equivalent lock means which may have been employed, will be removed. Handle 6 will then be pushed inwardly toward post 1 sufficiently to clear hook portion 16, whereupon the handle will be lifted above the hook portion and swung away from post 1 to release the upper end of gate bar 5, after which the latter may be lifted out of loop 19 to open the gate.

It will be understood that various changes may be made in the details of construction of the illustrative embodiment within the scope of the appended claims without departing from the spirit of this invention.

What I claim and desire by Letters Patent is:

1. A gate fastener for securing a gate having an end bar to a fixed gate post, comprising, an operating arm having an integral hook portion at one end thereof adapted to receive said bar, a lever arm rigidly secured to the outer end of the hook portion to extend therefrom oppositely to said operating arm, a flexible link having one end pivotally journalled in a portion of the lever arm remote from the hook portion and the other end adapted to be secured to the gate post, and latch means adapted to be mounted on the post to receive the free end of said operating arm.

2. A gate-fastener as defined by claim 1, wherein said flexible link is a length of chain.

3. A gate-fastener as defined by claim 1, wherein said latch means comprises an upwardly facing hook mounted on said post in angularly spaced relation to the point of connection of said link to the post.

4. A gate fastener for securing a gate having an end bar to a fixed gate post, comprising, an elongated operating arm having an integral curved keeper portion at one end thereof defining on its inner surface a concave arcuate seat adapted to receive said end bar, a lever arm rigidly secured to the outer end of said keeper portion to extend therefrom oppositely to said operating arm and substantially parallel thereto, a clevis member extending about the lever arm and pivotally journalled in a portion of the lever arm remote from the keeper portion, a flexible link having one end secured to the clevis member and the other adapted to be attached to the gate post, and latch means adapted to be mounted on the post to receive the free end of said operating arm.

References Cited in the file of this patent

UNITED STATES PATENTS

| | | |
|---|---|---|
| 1,264,120 | Neiss | Apr. 23, 1918 |
| 1,282,368 | Behl | Oct. 22, 1918 |
| 1,822,640 | Anderson | Sept. 8, 1931 |